United States Patent
Senoo et al.

(10) Patent No.: US 11,267,303 B2
(45) Date of Patent: Mar. 8, 2022

(54) SUSPENSION DEVICE AND LOWER ARM

(71) Applicant: ISUZU MOTORS LIMITED, Tokyo (JP)

(72) Inventors: Daisuke Senoo, Fujisawa (JP); Atsushi Itou, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/770,545

(22) PCT Filed: Dec. 5, 2018

(86) PCT No.: PCT/JP2018/044661
§ 371 (c)(1),
(2) Date: Jun. 5, 2020

(87) PCT Pub. No.: WO2019/111924
PCT Pub. Date: Jun. 13, 2019

(65) Prior Publication Data
US 2021/0162825 A1  Jun. 3, 2021

(30) Foreign Application Priority Data
Dec. 8, 2017  (JP) .............................. JP2017-236360

(51) Int. Cl.
*B60G 3/20* (2006.01)
*B60G 7/00* (2006.01)
(52) U.S. Cl.
CPC ............... *B60G 3/20* (2013.01); *B60G 7/001* (2013.01); *B60G 2204/121* (2013.01);
(Continued)
(58) Field of Classification Search
CPC .... B60G 3/20; B60G 7/001; B60G 2204/121; B60G 2204/41; B60G 2204/43; B60G 2206/124; B62D 21/11
See application file for complete search history.

(56) References Cited

U.S. PATENT DOCUMENTS 1,976,409 A * 10/1934 Nutt ....................... B60G 3/26
280/124.127
3,257,123 A * 6/1966 Giovinazzo ............ B60G 11/36
280/124.141
(Continued)

FOREIGN PATENT DOCUMENTS

DE    102008000982 A1    11/2009
EP        0857590 A1     8/1998
(Continued)

OTHER PUBLICATIONS

International Search Report and Written Opinion for related JP App. No. PCT/JP2018/044661 dated Feb. 12, 2019; 7 pages.
(Continued)

*Primary Examiner* — Paul N Dickson
*Assistant Examiner* — Timothy Wilhelm
(74) *Attorney, Agent, or Firm* — Procopio, Cory, Hargreaves & Savitch LLP

(57) ABSTRACT

A suspension device according to one embodiment of the present disclosure which is equipped with an upper arm, a lower arm, and a leaf spring positioned so as to extend in the vehicle widthwise direction in a manner such that an end section thereof is provided in the lower arm, wherein: the lower arm has an opening which opens to the inside in the vehicle widthwise direction; the leaf spring extends into the lower arm through the opening; the end section of the leaf spring is supported by a support part of the lower arm; and a cover section of the lower arm covers the end section of the leaf spring at a distance therefrom, and has a prescribed reinforcing shape.

8 Claims, 6 Drawing Sheets

(52) U.S. Cl.
CPC ...... *B60G 2204/41* (2013.01); *B60G 2204/43* (2013.01); *B60G 2206/124* (2013.01)

(56) References Cited

U.S. PATENT DOCUMENTS

| | | | | | |
|---|---|---|---|---|---|
| 4,458,918 | A | * | 7/1984 | Rumpel | B60G 3/202 267/262 |
| 4,619,466 | A | * | 10/1986 | Schaible | B60G 11/08 267/273 |
| 4,887,841 | A | * | 12/1989 | Cowburn | B60G 11/08 280/124.109 |
| 5,826,896 | A | * | 10/1998 | Baumann | B60G 11/08 280/124.171 |
| 5,833,026 | A | * | 11/1998 | Zetterstrom | B60G 3/202 180/360 |
| 6,029,987 | A | * | 2/2000 | Hoffman | B60G 11/10 267/260 |
| 6,378,881 | B2 | * | 4/2002 | Stenvall | B60G 3/06 280/124.171 |
| 6,457,729 | B2 | * | 10/2002 | Stenvall | B60G 3/06 280/124.134 |
| 6,588,779 | B2 | * | 7/2003 | Sandahi | B60G 3/20 280/124.135 |
| 6,832,773 | B2 | * | 12/2004 | Yokoyama | B60G 11/08 280/124.171 |
| 7,971,890 | B2 | * | 7/2011 | Richardson | B60G 11/04 280/124.163 |
| 10,974,558 | B2 | * | 4/2021 | Rochell | B60G 11/10 |
| 2001/0042967 | A1 | * | 11/2001 | Stenvall | B60G 3/06 280/124.163 |
| 2003/0222387 | A1 | | 12/2003 | Yokoyama | |
| 2004/0051262 | A1 | * | 3/2004 | Young | B62K 5/00 280/7.12 |
| 2004/0090032 | A1 | | 5/2004 | Raleigh et al. | |
| 2013/0113177 | A1 | * | 5/2013 | Seethaler | B60G 3/06 280/124.145 |
| 2020/0307331 | A1 | * | 10/2020 | Senoo | B60G 11/08 |
| 2020/0369107 | A1 | * | 11/2020 | Senoo | B60G 7/02 |

FOREIGN PATENT DOCUMENTS

| | | |
|---|---|---|
| JP | S62-072202 A | 8/1987 |
| JP | H05-012208 A | 2/1993 |
| JP | H07112607 A | 5/1995 |
| JP | H11-105522 A | 4/1999 |
| JP | 2003341331 A | 12/2003 |
| JP | 2013209076 A | 10/2013 |
| WO | 91-04875 A1 | 4/1991 |
| WO | 2015-151064 A1 | 10/2015 |

OTHER PUBLICATIONS

Japanese Patent Office, Notice of Reasons for Refusal, Application No. JP 2017-236360, dated Nov. 19, 2021, in 9 pages.

* cited by examiner

[FIG.1]
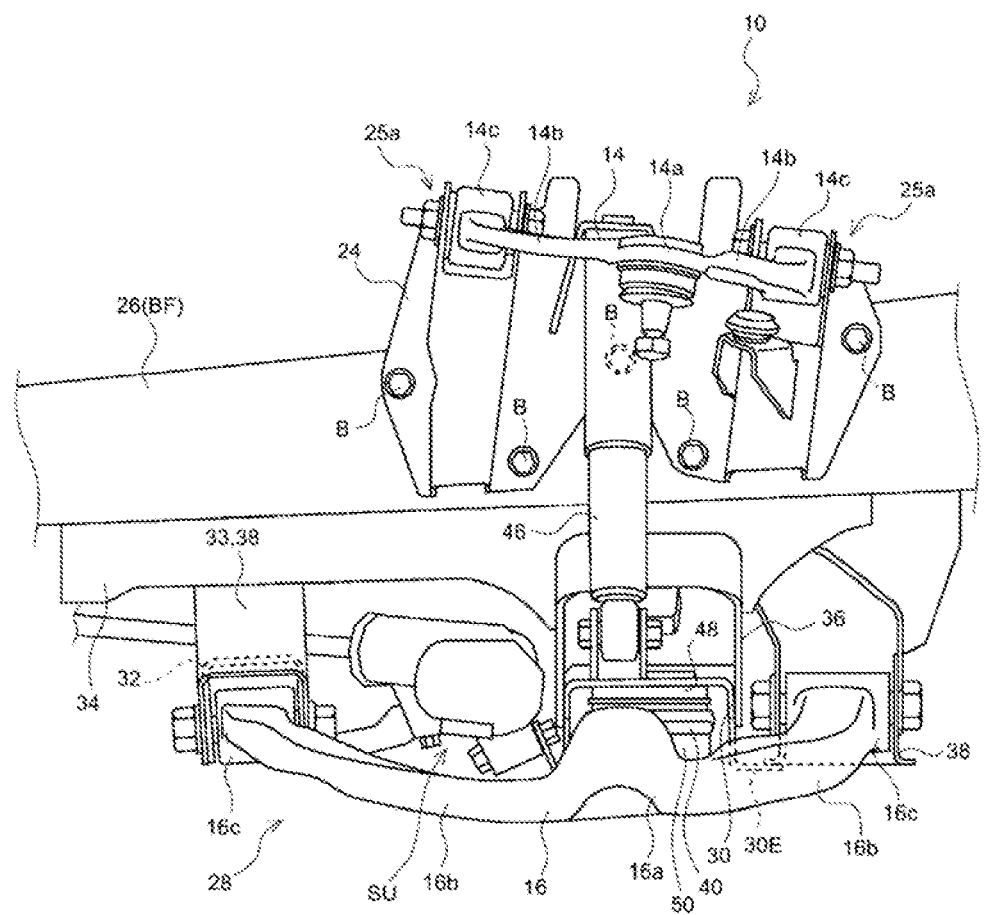

[FIG.2]
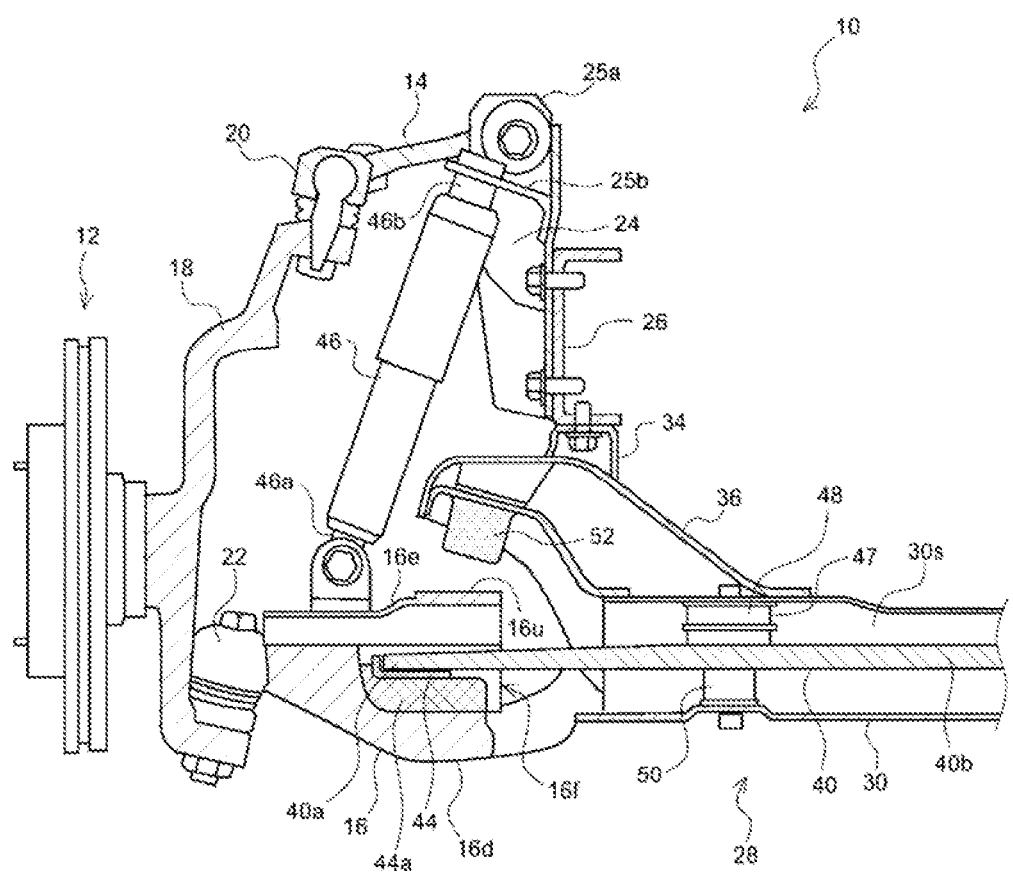

[FIG.3]
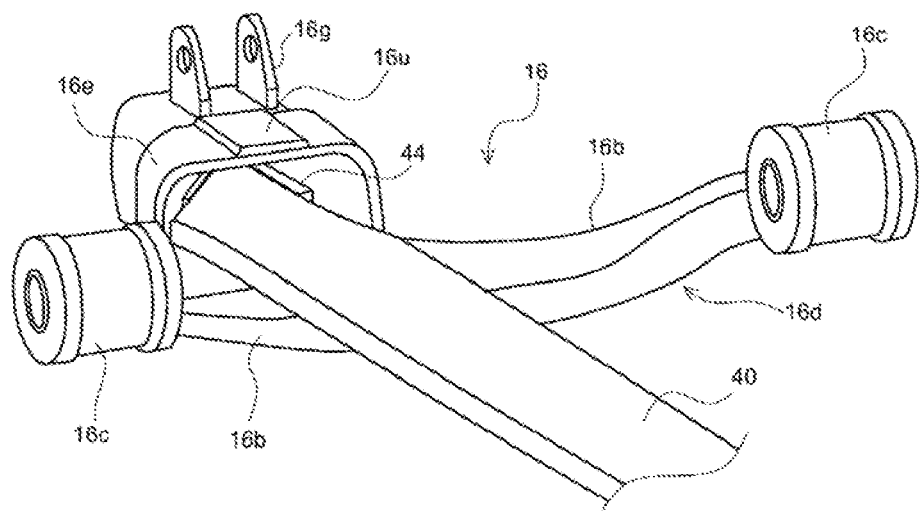

[FIG.4]
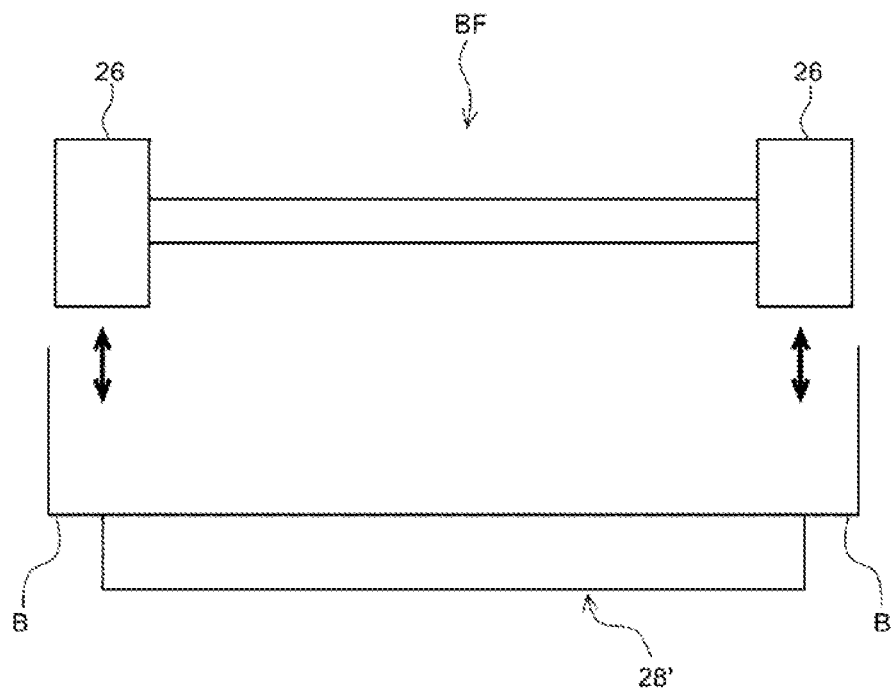

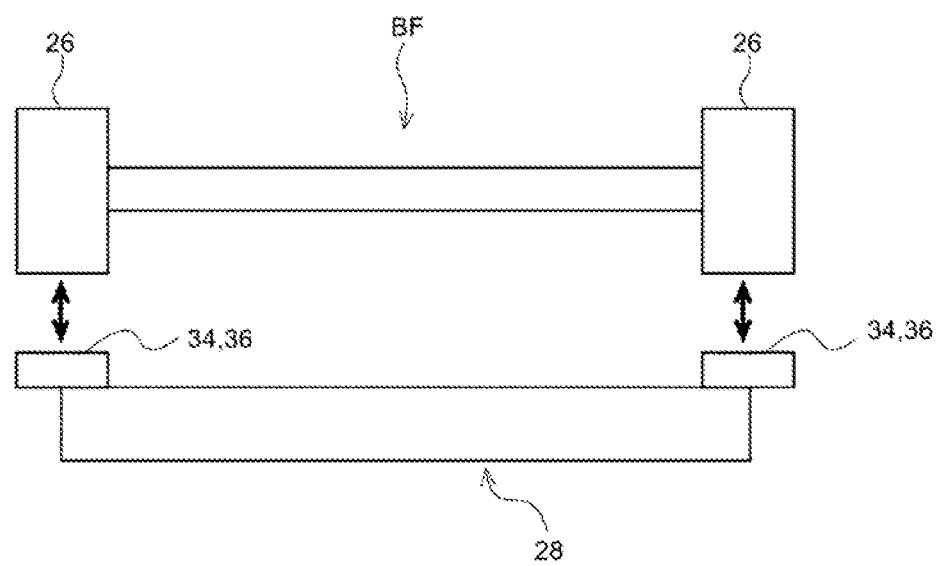
[FIG.5]

[FIG.6]
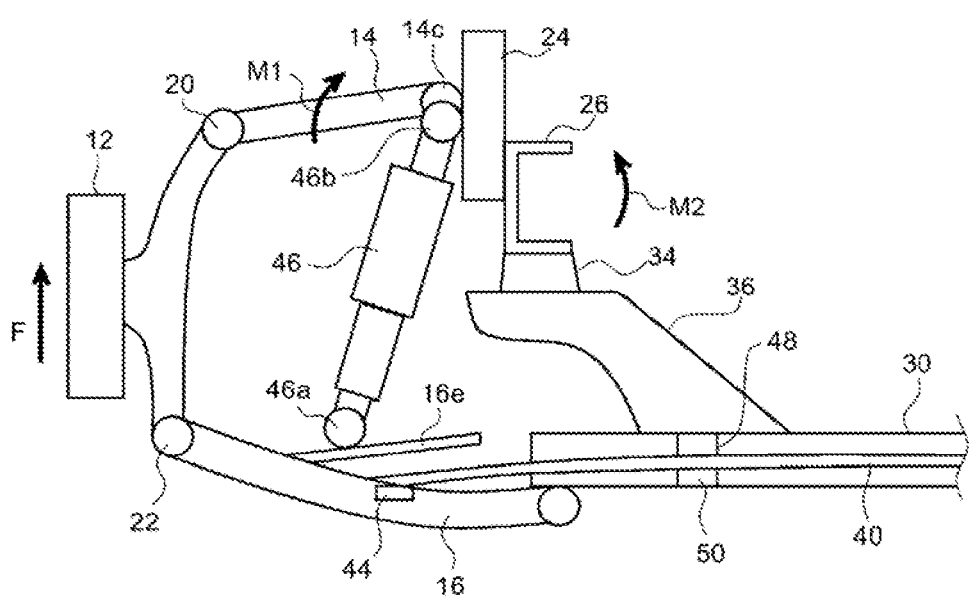

SUSPENSION DEVICE AND LOWER ARM

CROSS-REFERENCE TO RELATED APPLICATIONS

This application is a U.S. National Stage entry of PCT Application No. PCT/JP2018/044661, filed on Dec. 5, 2018, which claims priority to JP Application No. 2017-236360, filed on Dec. 8, 2017. The contents of the foregoing am incorporated by reference.

TECHNICAL FIELD

The present disclosure relates to a suspension device of an independent suspension type for a vehicle, and a lower arm for the suspension device.

BACKGROUND ART

In a vehicle, a suspension device of a double wishbone type, which is one of independent suspension types for wheels, has been used in the related art. This kind of suspension device includes an upper arm that is swingably supported, by a side member of a vehicle body frame, around a support shaft, and a lower arm that is swingably supported, by a suspension cross member on the vehicle body side, around a support shaft. The upper arm and the lower arm are connected to a knuckle of a wheel.

Patent Literature 1 discloses an example of such a suspension device. The suspension device of Patent Literature 1 includes the upper arm and the lower arm that are connected to a knuckle via a ball joint. Further, the suspension device includes a coil spring provided between the lower arm and a spring receiver fixed to the vehicle body frame, a shock absorber extending to a center of the coil spring, and a leaf spring disposed laterally in a vehicle width direction and having both ends connected to corresponding lower arms.

CITATION LIST

Patent Literature

Patent Literature 1: JP-A-H7-112607

SUMMARY OF INVENTION

Technical Problem

It is conceivable to carry out various improvements in the suspension device of Patent Literature 1. For example, it is conceivable to increase a degree of freedom in design by attempting to improve relationships between various constituent elements. However, even if such improvements are achieved, it is necessary to avoid a significant increase in a weight of the suspension device or a significant decrease in the strength (rigidity) thereof. This also applies to the lower arm disposed near the wheel.

An object of a technology of the present disclosure is to reduce a weight of a lower arm while maintaining the strength of the lower arm at a certain degree or more in a suspension device.

Solution to Problem

To achieve the above object, a technology of the present disclosure provides a suspension device including: an upper arm configured to swingably support a knuckle of a wheel, the upper arm being configured to be swingably supported by a side member extending in a vehicle front-rear direction; a lower arm configured to swingably support the knuckle, the lower arm being configured to be swingably supported by a suspension cross member extending in a vehicle width direction; a shock absorbing device disposed between the lower arm and the side member; and a leaf spring extending in the vehicle width direction, the leaf spring having an end portion disposed on the lower arm, in which the lower arm has an opening portion opening inward in the vehicle width direction, the leaf spring extends into the lower arm through the opening portion, the end portion of the leaf spring being supported by a support portion of the lower arm, and a cover portion of the lower arm covers the end portion of the leaf spring at a distance from the end portion, the cover portion having a predetermined reinforcing shape.

When a main cross member of the suspension cross member is connected to a vertically lower side of the side member via a bracket, the bracket being in a state where the upper arm and the shock absorbing device are not connected to the bracket, and an intermediate part of the leaf spring may be accommodated in the main cross member of the suspension cross member.

Preferably, the lower arm includes: a lower arm main body portion including: abase portion; and an arm portion extending in a bifurcated manner from the base portion; and the cover portion attached to the lower arm main body portion, the opening portion is defined and formed in the lower arm by attaching the cover portion to the lower arm main body portion, and the leaf spring is separated from an inner surface of the cover portion.

Preferably, in the lower arm, the cover portion has a substantial arch shape at the opening portion.

One end of the shock absorbing device may be connected to an outer surface of the cover portion.

The bracket may include a bracket buffer portion, and the outer surface of the cover portion may has a part where the bracket buffer portion is configured to contact.

The present disclosure is also directed to the lower arm for the suspension device.

Advantageous Effects of Invention

The suspension device according to the technology of the present disclosure can reduce the weight of a lower arm while maintaining the strength of the lower arm at a certain degree or more since the suspension device having the above configuration.

BRIEF DESCRIPTION OF DRAWINGS

FIG. 1 is a configuration view of a suspension device according to an embodiment of a technology of the present disclosure, and is a view seen from a side of a vehicle.

FIG. 2 is a configuration view of the suspension device of FIG. 1 on one wheel side, and is a partial cross-sectional view.

FIG. 3 is a view illustrating a lower arm and a leaf spring of the suspension device of FIG. 1.

FIG. 4 is a diagram showing assembly in a suspension device according to the related art.

FIG. 5 is a diagram showing assembly in the suspension device of FIG. 1.

FIG. 6 is a schematic diagram showing the suspension device of FIG. 2.

DESCRIPTION OF EMBODIMENTS

An embodiment of the present disclosure will be described below with reference to the accompanying drawings. The same components (or configurations) are denoted by the same reference numerals, and names and functions thereof are also the same. Therefore, detailed descriptions of the same components are not repeated.

FIG. 1 illustrates a schematic configuration of a part of a suspension device 10 according to an embodiment of a technology of the present disclosure. FIG. 2 illustrates a configuration of the suspension device 10 on one wheel side, and a part thereof is illustrated in cross section. Here, the suspension device 10 is applied to a front wheel of a vehicle, and a reference numeral "12" in FIG. 2 indicates a hub that supports a left front wheel (not illustrated). FIG. 1 is a view, seen from a lateral side of the left front wheel, of the suspension device 10 in FIG. 2 (illustrating with the hub and a knuckle of the left front wheel excluded). A right front wheel side (not illustrated) has substantially a configuration that is bilaterally symmetric with the configuration of FIGS. 1 and 2, so that descriptions thereof will be substantially omitted below. A vehicle width direction is a direction substantially perpendicular to a paper plane in FIG. 1 and is a direction substantially parallel to a paper plane in FIG. 2, and a vehicle front-rear direction is a direction substantially parallel to the paper plane in FIG. 1 and is a direction substantially perpendicular to the paper plane in FIG. 2.

The suspension device 10 is configured as a suspension device of an independent suspension type. The suspension device 10 includes an upper arm 14 having a substantial V shape or a substantial A shape in a plan view, and a lower arm 16 having a substantial V shape or a substantial A shape in a plan view. An upper part of a knuckle 18 of a wheel is pivotally supported, that is, swingably supported via a ball joint 20 by the upper arm 14, particularly by an outer end portion (base portion) 4a of the upper arm 14 in the vehicle width direction. A lower part of the knuckle 18 of the wheel is swingably supported via a ball joint 22 by the lower arm 16, particularly by an outer end portion (base portion) 16a of the lower arm 16 in the vehicle width direction.

An arm end portion 14c of each of two arm portions 14b, which are bifurcated inward in the vehicle width direction from the base portion 14a of the upper arm 14, is connected to an upper arm bracket 25a of a bracket 24. Thus, the upper arm 14 is swingably supported around a support shaft of the brackets 25a. The bracket 24 is fixed to a side member 26 extending in the vehicle front-rear direction. The side members 26 are constituent elements of a vehicle body frame 1F (not illustrated in its entirety), and are disposed on both sides of the vehicle. In the suspension device 10, as illustrated in FIG. 1, the bracket 24 is fixed to the side member 26 by five bolts B arranged in a W shape. However, the number, arrangement, and the like of the bolts for fixing the bracket 24 are not limited to this example.

A suspension cross member 28 is disposed, in the vehicle width direction, on a vertically lower side of, that is, below the left and right side members 26 of the vehicle body frame BF (FIGS. 1 and 2 illustrate only the side member 26 on the left side of the vehicle). The suspension cross member 28 has a certain width in the vehicle front-rear direction and includes a plurality of members extending in the vehicle width direction and a plurality of members extending in the vehicle front-rear direction that connect these above members. Specifically, the suspension cross member 28 includes a main cross member 30 extending in the vehicle width direction, a sub-cross member 32 extending in the vehicle width direction, and a vertical member 34 extending in the vehicle front-rear direction. Here, the sub-cross member 32 is separated from the main cross member 30 and is disposed substantially parallel to the main cross member 30 on a vehicle front side of the main cross member 30. The vertical member 34 is provided across the main cross member 30 and the sub-cross member 32. Here, constituent elements of the suspension cross member are generally formed of steel materials and are integrated by welding, but the materials and joining methods are not limited to this example. In addition, as for such a configuration of the suspension cross member 28, a configuration that the suspension cross member only includes a main cross member is not excluded in the present disclosure. As illustrated in FIGS. 1 and 2, in the suspension device 10, the vertical member 34 comes into contact with the side member 26 when the suspension cross member 28 is attached and fixed to the side member 26. In addition, the main cross member 30 and the sub-cross member 32 support a steering gear box SU therebetween.

More specifically, the main cross member 30 is attached to the vertical member 34 via a bracket 36. The bracket 36 is attached to an upper portion of the main cross member 30 of the suspension cross member 28. The bracket 36 covers the main cross member 30 from above as illustrated in FIG. 1, and is provided on the upper portion of the main cross member 30 relative to an end portion (in the vehicle width direction) of the main cross member 30 as illustrated in FIG. 2. As illustrated in FIGS. 1 and 2, the vertical member 34 straddles an upper portion of the bracket 36. In this way, in the suspension device 10, the bracket 36 is incorporated into the suspension cross member 28. However, the bracket 36 may be attached to an outer side of the suspension cross member 28 (that is, the suspension cross member 28 may be attached to the side member 26 via the bracket 36). In any of these aspects, the suspension cross member 28 is connected to the vertically lower side of the vehicle body frame BF (side member 26), and at this time, the bracket 36 is located in the suspension cross member 28 or on an upper side of the suspension cross member 28. Hereinafter, in order to distinguish the bracket 36 from the bracket 24, the bracket 24 is referred to as an upper bracket, and the bracket 36 is referred to as a lower bracket. The lower bracket 36 corresponds to a bracket (which is in a state where the upper arm and a shock absorbing device are not connected to the bracket) in the technology of the present disclosure.

The sub-cross member 32 is also attached to the vertical member 34 via a support bracket 33. A lower end portion of the support bracket 33 extending in a substantially vertical direction (substantially upper-lower direction) is joined to each of both end portions of the sub-cross member 32 in the vehicle width direction so as to cover the sub-cross member 32 from above. In this way, an upper end portion of the support bracket 33 joined to the sub-cross member 32 is joined to the vertical member 34, so that the sub-cross member 32 is attached to the vertical member 34.

The suspension cross member 28 further includes lower arm brackets 38. An arm end portion 16c of each of two arm portions 16b that bifurcate inward in the vehicle width direction from the base portion 16a of the lower arm 16 is connected to the lower arm bracket 38. Thus, the lower arm 16 is swingably supported around a support shaft of the brackets 38. Here, as illustrated in FIG. 1, the lower arm brackets 38 sandwich the main cross member 30 in the vehicle front-rear direction. Here, the lower arm bracket 38 on the vehicle front side is also configured as the support bracket 33 joined to the outer end portion of the sub-cross member 32 in the vehicle width direction. Therefore, the lower arm bracket 38 on the vehicle front side serves as the support bracket 33. The lower arm bracket 38 on the vehicle rear side is connected to an extension portion 30 of the main cross member 30, and an upper end portion of the lower arm bracket 38 is attached and fixed to the vertical member 34. Thus, the lower arm 16 is not directly connected to the lower bracket 36, and the lower bracket 36 is separated from the lower arm 16.

In the suspension device 10, a leaf spring 40 is disposed horizontally so as to extend in the vehicle width direction. The leaf spring 40 passes through an inner cavity 30s of the main cross member 30 of the suspension cross member 28. One end portion 40a of the leaf spring 40 is disposed on a support portion 44 of the lower arm 16 on the left front wheel side (the hub 12 side in FIG. 2) as described below, and the other end portion of the leaf spring 40 is similarly disposed on a support portion 44 of the lower arm 16 on a right front wheel side (not illustrated).

The support portion 44 is formed on a vertically upper side of, that is, above a substantial triangular region formed between the base portion 16a of the lower arm 16 and the arm portion 16b extending in the bifurcated manner from the base portion 16a, such that the support portion 44 is substantially horizontal in the vehicle. The leaf spring 40 has a shape that generally extends in the vehicle width direction and is curved to slightly protrude upward in the vertical direction. An intermediate part 40b of the leaf spring 40 is accommodated in the suspension cross member 28. More specifically, the intermediate part 40b is accommodated in the main cross member 30 of the suspension cross member 28, and is supported, by a bushing member 47, with respect to the main cross member 30. More specifically, the intermediate part 40b of the leaf spring 40 is supported, with respect to the main cross member 30, by the bushing member 47 on the left front wheel side (an upper bushing 48 and a lower bushing 50), and a bushing member (not illustrated) on the right front wheel side (an upper bushing and a lower bushing). The bushing member 47 includes the upper bushing 48 located on a vertically upper side of the leaf spring 40 and connected to an inner surface of the main cross member 30, and the lower bushing 50 located on a vertically lower side of the leaf spring 40 and connected to an inner surface of the main cross member 30. The leaf spring 40 is pressed against the support portion 44 of the lower arm 16 by the upper bushing 48. The upper bushing 48 corresponds to a transmission unit that can transmit a force from the leaf spring 40 to the suspension cross member 28. The lower bushing 50 supports the leaf spring 40 so that the leaf spring 40 can play various roles or functions, for example, play roles as a stabilizer. By providing the lower bushing 50 as well, the leaf spring 40 can be curved in a substantial S shape and can act on both the left and right front wheels when different forces are generated at the left and right front wheels, for example, when the left front wheel is lifted upward, but the right front wheel is lowered downward.

As illustrated in FIG. 3, the lower arm 16 includes the support portion 44 and a lower arm cover portion 16e covering an upper side of the support portion 44 in the vertical direction. In order to clarify the distinction with the cover portion 16e, a main body portion 16d, which includes the base portion 16a and the arm portions 16b extending in the bifurcated manner from the base portion 16a as described above, may be referred to as a lower arm main body portion.

In the lower arm 16, the lower arm main body portion 16d is provided with the support portion 44 for supporting the end portion of the leaf spring 40. The support portion 44 is placed on the lower arm 16 and can be detached or replaced with respect to the lower arm 16. Similar to the lower arm 16, the support portion 44 is formed of a steel material in the metal materials. An elastic body 44a is provided on a lower side of the support portion 44. The elastic body 44a increases buffer capacity when a large fore acts on the support portion 44, and further, absorbs a difference between a rotation trajectory of the lower arm 16 and a rotation trajectory of the leaf spring 40. The lower arm 16, in which the cover portion 16e is attached to the lower arm main body portion 16d, has an opening portion 16f opening inward in the vehicle width direction. The opening portion 16f is defined by attaching the cover portion 16e to the lower arm main body portion 16d. The leaf spring 40 extends in a space in the lower arm 16 through the opening portion 16f, and the end portion 40a of the leaf spring 40 is supported by the support portion 44 of the lower arm 16.

A shock absorber 46, which is a shock absorbing device, extends between the lower arm 16 and the side member 26 having the above configuration. One end portion 46a of the shock absorber 46 is connected to the lower arm 16. A connection portion 16g of the lower arm 16 with respect to the shock absorber 46 is provided on an outer surface on a vertically upper side of the cover portion 16e of the lower arm 16, and is located substantially above a vicinity of the base portion 16a of the lower arm 16. The other end portion 46b of the shock absorber 46 is connected to a connection portion 25b, between the two upper arm brackets 25a, of the upper bracket 24.

In the suspension device 10 having the above configuration, as is apparent from the above description and drawings, the upper bracket 24, which is connected to an outer side of the side member 26 in the vehicle width direction is independent of and separated from the suspension cross member 28 connected to the vertically lower side of the side member 26. In contrast, in a suspension device according to the related art, a bracket connecting a suspension cross member to a side member extends to the outside of the side member 26 in the vehicle width direction. For example, in a suspension device of Patent Literature 1, a bracket connecting the suspension cross member to the side member covers a periphery of a coil spring extending around the shock absorber, and is integrated with a spring receiver. Therefore, in the suspension device of Patent Literature 1, a design relationship between constituent members is very strong. Since the suspension device 10 has the above configuration, the suspension device 10 has a high degree of freedom in design as compared with such a suspension device according to the related art. The upper bracket 24 is independent of the lower bracket 36 covering the end portion of the main cross member 30 from above and located on a vertically lower side of, that is, below the side member 26. Thus, the upper arm 14 and the shock absorber 46, which are connected to the upper bracket 24, are not directly connected to the lower bracket 36, that is, in a disconnected state. Therefore, the suspension device 10 has a higher degree of freedom in design. In this way, the suspension device 10 has a configuration in which the upper bracket 24 and the lower bracket 36 are independent of each other.

Since the suspension device 10 has a configuration in which the upper bracket 24 and the lower bracket 36 are independent of each other, the suspension device 10 is excellent in the assimilability of the vehicle body frame BF. Here, a suspension device according to the related art will be described first. FIG. 4 schematically shows a vehicle body frame BF including left and right side members 26, and a suspension cross member 28' including brackets B having a substantially L-shaped cross section as the bracket described in Patent Literature 1. As can be seen from FIG. 4, in the suspension device according to the related art, when the suspension cross member 28' including the brackets B is assembled with the vehicle body frame BF, precise positioning, between the suspension cross member 28' and the vehicle body frame BF, in the front, the rear, the left, and the right, and a horizontal direction is required.

In contrast, in the suspension device 10 according to the present embodiment, the upper bracket 24 and the lower bracket 36 (that is, the suspension cross member 28) are separated from and independent of each other as described above. That is, the upper bracket 24 is not fixed to the suspension cross member 28 and is independent of and separated from the suspension cross member 28. With this configuration, the upper bracket 24 may be attached to the side member 26 separately from the suspension cross member, and the suspension cross member 28 including the lower bracket 36 may be attached to the side member 26 separately from the upper bracket 24. The upper arm 14 and the shock absorber 46 are attached to the upper bracket 24. Then, the suspension cross member 28 including the lower bracket 36 (which is in a state where the upper arm 14 and the shock absorber 46 are not connected to the lower bracket 36) is assembled. Although the upper bracket 24 and the suspension cross member 28 are connected via the shock absorber 46 and the lower arm 16, positions of the upper bracket 24 and the suspension cross member 28 are not determined fixedly. This is readily understood from the fact that the lower arm 16 is swingably attached to the suspension cross member 28 and the end portion 46a of the shock absorber 46 is rotatable (swingable) around a support shaft. Therefore, as schematically shown in FIG. 5, when the suspension cross member 28 is attached to the vehicle body frame BF, rough positioning of the suspension cross member 28 and the vehicle body frame BF, in the front, the rear, the left and the right, and a horizontal direction is performed without a need for the precise positioning in the suspension device according to the related art, so that the suspension cross member 28 and the vehicle body frame BF are in contact with each other, and then the positional relationship can be finely adjusted. In a state where the suspension cross member 28 is fixed to the vehicle body frame BF (in particular, the side member 26) together with the lower bracket 36, the upper bracket 24 can be firmly fixed to the side member 26. In this way, by adopting the above configuration in which the upper bracket 24 and the lower bracket 36 (that is, the suspension cross member 28) are independent of and separated from each other, it is possible to improve the assemblability of the constituent elements, particularly the suspension cross member 28, to the vehicle body frame BF (mainly the side member 26) in the suspension device 10.

Further, the suspension device 10 is excellent in the strength or the rigidity as described below with reference to FIGS. 2 and 6. FIG. 6 is a schematic diagram of the suspension device of FIG. 2.

First, as described above, one end portion 46a of the shock absorber 46 is connected to the lower arm 16, and the other end portion 46b of the shock absorber 46 is connected to the upper bracket 24. In the vehicle width direction, the connection portion of the shock absorber 46 to the lower arm 16 is outside the upper bracket 24. Then, the upper bracket 24 is connected to the side member 26 from the outside in the vehicle width direction. Therefore, the shock absorber 46 can exert a force to the side member 26 from the outside to the inside of the vehicle in the vehicle width direction, in this way, a first transmission route of the force from the outside in the vehicle width direction to the side member 26 is formed.

A second transmission route of a force, which is different from the first transmission route of the force from the outside in the vehicle width direction to the side member 26, is formed on the vertically lower side of the side member 26. In the second transmission route, the upper bushing 48 and the lower bracket 36 that is independent of the upper bracket 24 are provided. In the second transmission route, the force from the leaf spring 40 can be applied to the side member 26 via the upper bushing 48, the main cross member 30, the lower bracket 36, and the vertical member 34 in this order.

In the suspension device 10, for example, when a force F to lift the hub 12 upward in the vertical direction acts on the wheel, a moment M1 from the outside of the vehicle to the inside of the vehicle as schematically shown in FIG. 6 may act on the side member 26 via the lower arm 16 and the shock absorber 46 in the first transmission route. On the other hand, when the force F acts on the wheel (the hub 12), a force is transmitted from the lower arm 16 to the leaf spring 40, and then a force from the leaf spring, that is, an elastic force is transmitted to the main cross member 30 via the upper bushing 48. As a result, since the lower bracket 36 (independent of the upper bracket) is disposed on the vertically lower side of the side member 26, a moment M2 from the inside of the vehicle to the outside of the vehicle as schematically shown in FIG. 6 can act on the side member 26. As can be seen from FIG. 6, these moments M1 and M2 are forces in directions in which the moments M1 and M2 cancel each other out. That is, when the force F acts on the wheel (the hub 12), only a moment corresponding to the moment M1 acts on the side member 26 in the suspension device of Patent Literature 1, whereas the moments M1 and M2 in directions in which the moments M1 and M2 cancel each other out can act on the side member 26 in the suspension device 10 of the present embodiment. Therefore, the suspension device 10 of the present embodiment does not require a structural change accompanied by weight increase, for example, increasing a thickness of the side member, and is excellent in the rigidity with respect to the force F.

In the suspension device 10, the lower bracket 36 substantially has a connection region with the main cross member 30 on the inside of the vehicle relative to the side member 26 in the vehicle width direction (see FIGS. 2 and 6). The connection region extends to the vertically upper side of the upper bushing 48 (which is located inward than the side member 26 in the vehicle width direction). Therefore, as shown in FIGS. 2 and 6, the lower bracket 30 is formed such that a vertically upper part of the lower bracket 36 is located outward than a vertically lower part of the lower bracket 36 in the vehicle width direction. Therefore, when the force F acts on the wheel, the lower bracket 36 can apply an upward force, which is transmitted from the leaf spring 40 via the main cross member 30, to the side member 26 more suitably, and whereby the moment M2 can be generated. In this way, the lower bracket 36 can function as a force transmission member that transmits a force between the leaf spring 40 and the side member 26 via the main cross member 30, the upper bushing 48, or the like.

Further, the suspension device 10 excellent in the degree of freedom in design has the opening portion 16f in the lower arm 16 as described above. That is, the lower arm 16 has an open space (internal space) opening at the opening portion 16f. In particular, as illustrated in FIG. 2, the cover portion 16e of the lower arm 16 covers the end portion 40a of the leaf spring 40 at a distance from the end portion 40a.

The weight of the lower arm 16 is reduced by providing the space in this way, and the cover portion 16e of the lower arm 16 has a predetermined reinforcing shape to maintain the strength (rigidity) of the lower arm at a certain level or more. Specifically, in the lower arm 16, the cover portion 16e has a substantial arch shape (substantial U shape) at the opening portion 16f.

As described above, in the lower arm 16, the internal space is expanded by the cover portion 16e to achieve the weight reduction, and meanwhile, the shape of the cover portion 16e is set to a predetermined reinforcing shape so as to ensure the strength. A size of the internal space (for example, an interval between the leaf spring and the inner surface of the cover portion) and the reinforcing shape of the cover portion may be designed and selected in accordance with a situation of the vehicle that are expected to be used.

In addition, in the suspension device 10, various configurations are provided so as to increase the shock resistance and the like. For example, the lower bracket 36 is provided with a bump rubber 52. The bump rubber 52 is a bracket buffer portion and faces downward on the lower bracket 36. On an outer surface of the cover portion 16e of the lower arm 16 at a position facing the bump rubber 52, a part 16u where the bump rubber 52 is configured to contact (hereinafter, referred to as a receiving portion) is provided. Here, the receiving portion 16u of the lower arm 16 is provided as a thick portion on an upper surface of the cover portion 16e. When a force that compresses the shock absorber 46 in an axial direction thereof is generated, the bump rubber 52 may come into contact with the receiving portion 16u of the lower arm 16 by collisions or the like. The receiving portion 16u is provided on the cover portion 16e having the above-described predetermined reinforcing shape, so that the lower arm 16 can sufficiently withstand the collisions or the like.

The present disclosure is not limited to the above-described embodiment, and may be appropriately modified and implemented without departing from the scope of the present disclosure.

In the above embodiment, the internal space and the opening portion are formed in the lower arm by attaching the cover portion to the lower arm main body portion. However, the lower arm main body portion and the cover portion may be configured as an integral member from the beginning. Alternatively, the lower arm is not limited to including one or two members, and may be configured by combining three or more members.

In the above embodiment, the upper arm and the shock absorber are connected to the single upper bracket 24, but the upper bracket 24 is not limited to being a single member and may include two or more members. For example, the upper bracket 24 may include two separated upper arm brackets for connecting the upper arm, and a bracket for connecting the shock absorber, which is provided between the two separated upper arm brackets. These three brackets may be completely separate and independent, and are preferably integrally formed or integrated together.

Each constituent element of the technology of the present disclosure may be formed of various materials (which are not limited to being formed of a material as described above). For example, the support portion 44 is not limited to being formed of a steel material, and may be formed of other materials such as a non-ferrous metal material and a resin material. The support portion 44 may be formed of a material different from that of the lower arm.

The technology of the present disclosure is not limited to being applied to a front wheel of a vehicle, and may be applied to a rear wheel.

The present application is based on a Japanese Patent Application (Japanese Patent Application No. 2017-236360), filed on Dec. 8, 2017, the contents of which are incorporated herein by reference.

INDUSTRIAL APPLICABILITY

The present disclosure has an effect of being able to provide a suspension device in which the strength of the lower arm is ensured and the weight thereof is reduced, and is useful to contribute to the realization of a vehicle which is excellent in the safety and the traveling performances and has improved the fuel efficiency due to weight reduction.

REFERENCE SIGN LIST

10 Suspension device
14 Upper arm
16 Lower arm
18 Knuckle
24 Upper bracket
26 Side member
28 Suspension cross member
30 Main cross member
32 Sub-cross member
34 Vertical member
36 Lower bracket
40 Leaf spring
46 Shock absorber (shock absorbing device)
47 Bushing member
48 Upper bushing
50 Lower bushing

The invention claimed is:

1. A suspension device comprising:
an upper arm configured to swingably support a knuckle of a wheel, the upper arm being configured to be swingably supported by a side member extending in a vehicle front-rear direction;
a lower arm configured to swingably support the knuckle, the lower arm being configured to be swingably supported by a suspension cross member extending in a vehicle width direction;
a shock absorbing device disposed between the lower arm and the side member; and
a leaf spring extending in the vehicle width direction, the leaf spring having an end portion disposed on the lower arm,
wherein the lower arm has an opening portion opening inward in the vehicle width direction,
wherein the leaf spring extends into the lower arm through the opening portion, the end portion of the leaf spring being supported by a support portion of the lower arm, and
wherein, when the end portion of the leaf spring is supported by the support portion, a cover portion of the lower arm covers the end portion of the leaf spring at a distance from the end portion to form an internal space between the cover portion and the end portion of the leaf spring, the cover portion having a predetermined reinforcing shape.

2. The suspension device according to claim 1,
wherein a main cross member of the suspension cross member is connected to a vertically lower side of the side member via a bracket, the bracket being in a state where the upper arm and the shock absorbing device are not connected to the bracket, and wherein an intermediate part of the leaf spring is accommodated in the main cross member of the suspension cross member.

3. The suspension device according to claim 2, wherein the bracket is provided separately from the main cross member.

4. The suspension device according to claim 1,
wherein the lower arm includes:
- a lower arm main body portion including: a base portion; and an arm portion extending in a bifurcated manner from the base portion; and
- the cover portion attached to the lower arm main body portion, wherein the opening portion is defined and formed in the lower arm by attaching the cover portion to the lower arm main body portion, and wherein the leaf spring is separated from an inner surface of the cover portion.

5. The suspension device according to claim 1,
wherein the cover portion has a substantial arch shape at the opening portion in the lower arm.

6. The suspension device according to claim 1,
wherein one end of the shock absorbing device is connected to an outer surface of the cover portion.

7. The suspension device according to claim 1,
wherein the bracket includes a bracket buffer portion, and
wherein an outer surface of the cover portion has a part where the bracket buffer portion is configured to contact.

8. The suspension device according to claim 1, wherein the support portion is removably provided in the lower arm.

* * * * *